US008081961B2

(12) United States Patent
Okita et al.

(10) Patent No.: US 8,081,961 B2
(45) Date of Patent: *Dec. 20, 2011

(54) NETWORK MANAGEMENT APPARATUS AND METHOD OF SELECTING BASE STATION FOR SOFTWARE UPDATE

(75) Inventors: Koichi Okita, Yokohama (JP); Ryosuke Kurata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 774 days.

This patent is subject to a terminal disclaimer.

(21) Appl. No.: 12/081,255

(22) Filed: Apr. 14, 2008

(65) Prior Publication Data

US 2008/0233943 A1    Sep. 25, 2008

Related U.S. Application Data

(63) Continuation of application No. 11/483,775, filed on Jul. 11, 2006, now Pat. No. 7,406,310, which is a continuation-in-part of application No. 10/636,806, filed on Aug. 8, 2003, now Pat. No. 7,447,497.

(30) Foreign Application Priority Data

Apr. 22, 2003  (JP) ................................. 2003-117281
Jun. 3, 2003   (JP) ................................. 2003-157584
Jul. 12, 2005  (JP) ................................. 2005-202799

(51) Int. Cl.
*H04M 3/00*      (2006.01)
*H04W 24/00*     (2009.01)
*G06F 15/177*    (2006.01)
*G06F 15/173*    (2006.01)
*G06F 9/44*      (2006.01)
*G06F 9/445*     (2006.01)

(52) U.S. Cl. ........ 455/418; 455/419; 455/423; 709/220; 709/224; 713/168; 713/174

(58) Field of Classification Search ................ 455/418, 455/419, 423, 424, 466, 560; 709/220, 224; 717/168–178
See application file for complete search history.

(56) References Cited

U.S. PATENT DOCUMENTS 5,345,448 A    9/1994  Keskitalo
(Continued)

FOREIGN PATENT DOCUMENTS

JP    7177567    7/1995
(Continued)

OTHER PUBLICATIONS

3 GPP TR 25.832 V4.0.0 (2001-3), $3^{RD}$ Generation Partnership Project; Technical Specification Group Radio Access Network; Manifestations of Handover and SRNS Relocation (Release 4), pp. 3-13.

(Continued)

*Primary Examiner* — George Eng
*Assistant Examiner* — Wesley Kim
(74) *Attorney, Agent, or Firm* — Brundidge & Stanger, P.C.

(57) ABSTRACT

A network management apparatus inputs a plurality of work dates and time periods to update software in a base station. The apparatus obtains an n-week average of the numbers of connection calls during each of the input time periods for each day of the week, based on statistical information about connection with a wireless terminal in each base station. The apparatus obtains an m-month average of the numbers of connection calls during each of the input time periods for each date, based on the statistical information. The apparatus calculates, for each of the time periods for a work date, an average or a weighted average of the n-week average and the m-month average to obtain a degree of impact upon a communication service. A processing section selects a work date and a time period having the minimum degree of impact and updates the software.

3 Claims, 15 Drawing Sheets

U.S. PATENT DOCUMENTS

| | | | |
|---|---|---|---|
| 5,526,357 A | 6/1996 | Jandrell | |
| 5,553,137 A | 9/1996 | Nyhart et al. | 379/406.06 |
| 5,752,161 A | 5/1998 | Jantti et al. | 455/8 |
| 6,147,983 A | 11/2000 | Backstrom | 370/330 |
| 6,324,411 B1 | 11/2001 | Genell | 455/561 |
| 6,535,740 B1 | 3/2003 | Kosugi | |
| 6,772,209 B1 | 8/2004 | Chernock et al. | 709/225 |
| 6,847,826 B1 | 1/2005 | Wesby et al. | |
| 6,873,855 B1 | 3/2005 | Shinohara et al. | |
| 6,978,145 B2 | 12/2005 | Takaba et al. | |
| 7,146,167 B2 | 12/2006 | Tanabe | |
| 7,190,952 B2 | 3/2007 | Okita et al. | |
| 7,194,258 B2 | 3/2007 | Okita et al. | |
| 2002/0075824 A1 | 6/2002 | Willekes et al. | 370/329 |
| 2002/0087668 A1 | 7/2002 | San Martin et al. | |
| 2002/0152305 A1 | 10/2002 | Jackson et al. | 709/224 |
| 2004/0235525 A1 | 11/2004 | Chater-Lea | |

FOREIGN PATENT DOCUMENTS

| | | |
|---|---|---|
| JP | 7319683 | 12/1995 |
| JP | 1063498 | 3/1998 |
| JP | 10320210 | 12/1998 |
| JP | 2980201 | 9/1999 |
| JP | 11298404 | 10/1999 |
| JP | 2000151501 | 5/2000 |
| JP | 2000324043 | 11/2000 |
| JP | 200156756 | 2/2001 |
| JP | 2001056759 | 2/2001 |
| JP | 2001/154896 | 6/2001 |
| JP | 2001/157247 | 6/2001 |
| JP | 2002057792 | 2/2002 |
| JP | 2004/080898 | 3/2004 |
| JP | 2005010821 | 1/2005 |
| JP | 2005057806 | 3/2005 |
| JP | 2005136811 | 5/2005 |
| JP | 200674683 | 3/2006 |
| JP | 200116227 | 1/2009 |
| KR | 19990080904 | 11/1999 |

OTHER PUBLICATIONS

U.S. Appl. No. 09/382,775, filed Aug. 25, 1999.

SOFTWARE-UPDATE BASE-STATION DATE-AND-TIME SELECTION-RESULT REPORT SCREEN 1 (DAILY)

[FIRST SCHEDULED TABLE] 3

| SCHEDULED DATE | BASE-STATION NUMBER | STATION NAME | SOFTWARE VERSION NUMBER | APPROVED | DATE OF NOTIFICATION |
|---|---|---|---|---|---|
| X(MONTH) Z (DAY), Y (YEAR) | 1 | STATION A | 1.1 | APPROVED | X(MONTH) Z (DAY), Y (YEAR) |
| | 26 | STATION Z | 1.1 | APPROVED | X(MONTH) Z (DAY), Y (YEAR) |
| ... | ... | ... | ... | ... | ... |
| X(MONTH) Z (DAY), Y (YEAR) | 3 | STATION C | 1.0 | NOT APPROVED | NOT YET NOTIFIED |

FIG. 5A

SOFTWARE-UPDATE BASE-STATION DATE-AND-TIME
SELECTION-RESULT REPORT SCREEN 2 (LIST OF BASE STATIONS)

[SECOND SCHEDULE TABLE]

| BASE-STATION NUMBER | STATION NAME | SOFTWARE VERSION NUMBER | APPLIED | SCHEDULED DATE | APPROVED | DATE OF NOTIFICATION |
|---|---|---|---|---|---|---|
| 1 | STATION A | 1.1 | APPLIED | X(MONTH) Z (DAY), Y (YEAR) | APPROVED | X(MONTH) Z (DAY), Y (YEAR) |
| 2 | STATION B | 1.0 | NOT APPLIED | – | – | – |
| 3 | STATION C | 1.0 | APPLIED | X(MONTH) Z (DAY), Y (YEAR) | NOT APPROVED | NOT YET NOTIFIED |
| ... | ... | ... | ... | | | |

FIG. 5B

[DAY-OF-WEEK CALL TABLE 5]

| DAY OF WEEK | TIME PERIOD (TIME) | AVERAGE OF NUMBERS OF CONNECTION CALLS | | | | N-WEEK AVERAGE |
|---|---|---|---|---|---|---|
| | | 1 WEEK AGO | 2 WEEKS AGO | ... | N WEEKS AGO | |
| MONDAY | 10:00 - 12:00 | 0 | 1 | | 0 | 1.5 |
| | 13:00 - 15:00 | 13 | 15 | | 14 | 14 |
| | 15:30 - 17:30 | 12 | 13 | | 14 | 13 |
| TUESDAY | 10:00 - 12:00 | 8 | 7 | | 9 | 8 |
| | 13:00 - 15:00 | 10 | 9 | | 8 | 9 |
| | 15:30 - 17:30 | 12 | 13 | | 11 | 12 |
| ... | ... | | | ... | | |
| SATURDAY | 10:00 - 12:00 | 0 | 2 | | 1 | 1 |
| | 13:00 - 15:00 | 3 | 5 | | 4 | 4 |
| | 15:30 - 17:30 | 2 | 3 | | 4 | 3 |
| SUNDAY | 10:00 - 12:00 | 4 | 3 | | 5 | 3 |
| | 13:00 - 15:00 | 2 | 3 | | 1 | 2 |
| | 15:30 - 17:30 | 2 | 4 | | 3 | 3 |
| HOLIDAY | 10:00 - 12:00 | 0 | 0 | | 1 | 1.3 |
| | 13:00 - 15:00 | 4 | 3 | | 2 | 3 |
| | 15:30 - 17:30 | 3 | 1 | | 2 | 2 |

FIG. 8

[DAILY CALL TABLE 6]

| DATE | TIME PERIOD (TIME) | AVERAGE OF NUMBERS OF CONNECTION CALLS | | | | M - MONTH AVERAGE |
|---|---|---|---|---|---|---|
| | | 1 MONTH AGO | 2 MONTH AGO | ... | M MONTHS AGO | |
| 1 | 10:00 - 12:00 | 5 | 6 | | 4 | 5 |
| | 13:00 -15:00 | 9 | 12 | | 6 | 9 |
| | 15:30 - 17:30 | 7 | 14 | | 9 | 10 |
| 2 | 10:00 - 12:00 | 3 | 4 | | 5 | 3 |
| | 13:00 -15:00 | 9 | 10 | | 8 | 9 |
| | 15:30 - 17:30 | 11 | 13 | | 12 | 12 |
| ... | | | | ... | | ... |
| 31 | 10:00 - 12:00 | 4 | 6 | | 2 | 4 |
| | 13:00 -15:00 | 9 | 16 | | 14 | 13 |
| | 15:30 - 17:30 | 13 | 8 | | 12 | 11 |

*FIG. 10*

[SERVICE IMPACT TABLE 7 FOR BASE-STATION NUMBER 1]

| MONTH/DAY (DAY OF WEEK) | TIME PERIOD (TIME) | DEGREE OF IMPACT ON COMMUNICATION SERVICES FOR USERS |
|---|---|---|
| 9/1 (SUNDAY) | 10:00 - 12:00 | 3.3 |
| | 13:00 -15:00 | 2.4 |
| | 15:30 - 17:30 | 2.9 |
| 9/2 (MONDAY) | 10:00 - 12:00 | 1.6 |
| | 13:00 -15:00 | 10.7 |
| | 15:30 - 17:30 | 11.9 |
| ... | ... | ... |
| 9/25 (THURSDAY) | 10:00 - 12:00 | 4.1 |
| | 13:00 -15:00 | 12.0 |
| | 15:30 - 17:30 | 10.3 |

FIG. 11A

[SERVICE IMPACT TABLE 7 FOR BASE-STATION NUMBER 2]

| MONTH/DAY (DAY OF WEEK) | TIME PERIOD | DEGREE OF IMPACT ON COMMUNICATION SERVICES FOR USERS |
|---|---|---|
| 9/1 (SUNDAY) | 10:00 - 12:00 | 12.9 |
| | 13:00 -15:00 | 9.8 |
| | 15:30 - 17:30 | 15.1 |
| 9/2 (MONDAY) | 10:00 - 12:00 | 13.3 |
| | 13:00 -15:00 | 9.4 |
| | 15:30 - 17:30 | 14.6 |
| ... | ... | ... |
| 9/25 (THURSDAY) | 10:00 - 12:00 | 14.2 |
| | 13:00 -15:00 | 11.0 |
| | 15:30 - 17:30 | 15.3 |

FIG. 11B

[SCHEDULE ADJUSTMENT TABLE 8]

| BASE-STATION NUMBER | DEGREE OF IMPACT ON COMMUNICATION SERVICE FOR USER | ADJACENT BASE STATION NUMBER | SCHEDULED MONTH/DAY (DAY OF WEEK) AND TIME PERIOD OF SOFTWARE UPDATE | TENTATIVE DETERMINATION/ DETERMINATION |
|---|---|---|---|---|
| 1 | 1.6 | 2,3,4,5,6,7 | 9/1 (SUNDAY) 10:00 - 12:00 | DETERMINATION |
| 2 | 9.4 | 1,3,7,8,... | 9/2 (MONDAY) 13:00 - 15:00 | TENTATIVE DETERMINATION |
| 3 | 8.1 | 1,2,4,8,... | 9/12 (THURSDAY) 15:30 - 17:30 | TENTATIVE DETERMINATION |
| 4 | 1.9 | 1,3,5,... | 9/6 (FRIDAY) 10:00 - 12:00 | TENTATIVE DETERMINATION |
| 5 | 2.4 | 1,4,6,... | 9/11 (WEDNESDAY) 10:00 - 12:00 | TENTATIVE DETERMINATION |
| 6 | 5.6 | 1,5,7,... | 9/8 (SUNDAY) 10:00 - 12:00 | TENTATIVE DETERMINATION |
| 7 | 10.2 | 1,2,6,... | 9/2 (MONDAY) 13:00 - 15:00 | TENTATIVE DETERMINATION |
| 8 | 10.0 | 2,3,... | 9/4 (WEDNESDAY) 10:00 - 12:00 | TENTATIVE DETERMINATION |
| ... | ... | ... | ... | ... |
| 21 | 12.3 | 22,... | 9/3 (TUESDAY) 10:00 - 12:00 | TENTATIVE DETERMINATION |
| 22 | 6.5 | 21,... | 9/4 (WEDNESDAY) 13:00 - 15:00 | TENTATIVE DETERMINATION |
| ... | ... | ... | ... | ... |

*FIG. 13*

[SCHEDULE ADJUSTMENT TABLE 8]

| BASE-STATION NUMBER | DEGREE OF IMPACT ON COMMUNICATION SERVICE FOR USER | ADJACENT BASE STATION NUMBER | SCHEDULED MONTH/DAY (DAY OF WEEK) AND TIME PERIOD OF SOFTWARE UPDATE | TENTATIVE DETERMINATION/ DETERMINATION |
|---|---|---|---|---|
| 1 | 1.6 | 2,3,4,5,6,7 | 9/1 (MONDAY) 10:00 - 12:00 | DETERMINATION |
| 2 | 9.8 | 1,3,7,8,.... | 9/2 (SUNDAY) 13:00 - 15:00 | DETERMINATION |
| 3 | 8.1 | 1,2,4,8,.... | 9/12 (THURSDAY) 15:30 - 17:30 | DETERMINATION |
| 4 | 1.9 | 1,3,5,.... | 9/6 (FRIDAY) 10:00 - 12:00 | DETERMINATION |
| 5 | 2.4 | 1,4,6,.... | 9/11 (WEDNESDAY) 10:00 - 12:00 | DETERMINATION |
| 6 | 5.6 | 1,5,7,.... | 9/8 (SUNDAY) 10:00 - 12:00 | DETERMINATION |
| 7 | 10.2 | 1,2,6,.... | 9/2 (MONDAY) 13:00 - 15:00 | DETERMINATION |
| 8 | 10.0 | 2,3,.... | 9/4 (WEDNESDAY) 10:00 - 12:00 | ... |
| ... | ... | ... | ... | ... |
| 21 | 12.3 | 22,.... | 9/3 (TUESDAY) 10:00 - 12:00 | DETERMINATION |
| 22 | 6.5 | 21,.... | 9/4 (WEDNESDAY) 13:00 - 15:00 | DETERMINATION |
| ... | ... | ... | ... | ... |

*FIG. 14*

NETWORK MANAGEMENT APPARATUS AND METHOD OF SELECTING BASE STATION FOR SOFTWARE UPDATE

CROSS-REFERENCES TO RELATED APPLICATIONS

The present application is a continuation application of application Ser. No. 11/483,775, filed Jul. 11, 2006, now U.S. Pat. No. 7,406,310; which is a continuation-in-part application of application Ser. No. 10/636,806, filed Aug. 8, 2003, now U.S. Pat. No. 7,447,497 the subject matter of which is incorporated by reference herein. Applicants hereby claim the right of priority based on Japanese Patent Application No. 2005-202799, filed in Japan on Jul. 12, 2005 and in Japanese Patent Application Nos. 2003-117281, filed in Japan on Apr. 22, 2003 and 2003-157584, filed in Japan on Jun. 3, 2003, the subject matter of which is also incorporated by reference herein.

BACKGROUND OF THE INVENTION

The present invention relates to network management apparatuses and methods of selecting a base station for software update. In particular, the present invention relates to a network management apparatus and a method of selecting a base station for software update for carrying out software update in a wireless communication system base station.

In typical conventional communication networks, it is important to ensure reliability to prevent interruption of communication. For this reason, software for providing communication services and controlling the operation of communication networks should be preferably updated without having to stop communication services. For example, a method of updating software in a system in which hardware is redundantly configured so that software installed in non-operating hardware is updated is disclosed in Japanese Unexamined Patent Application Publication No. Hei-7-319683 and No. 2001-56759.

On the other hand, wireless communication networks allow each base station to communicate with each wireless terminal within an area called a "cell", which is a coverage area of radio waves from the base station. Typical cells have a radius of several kilometers. Thus, typical wireless communication networks are characterized in that they can accommodate only a smaller number of users with a smaller coverage area, compared with known wired communication networks (exchange networks). To overcome this disadvantage, in a typical wireless communication network, a large number of such base stations need to be arranged to provide communication services over a wide area. For this reason, if such many base stations are redundantly configured in the same manner as the wired communication network facility described in the Japanese Unexamined Patent Application Publication No. Hei-7-319683 and No. 2001-56759, the economical efficiency of communication networks is significantly impaired. In addition, in that case, a plurality of frequency bands and CDMA spread codes need to be assigned, which leads to waste of limited resources and decreases the number of users resulting in declining the capability of providing users with services. As a solution to this drawback, a method of updating software installed in a base station while communication services of the base station are suspended during a certain time period, such as midnight, is disclosed in Japanese Unexamined Patent Application Publication No. Hei-10-63498.

Furthermore, in CDMA wireless communication networks, a technique for updating software while uninterruptedly switching a communication path from the current wireless base station to another wireless base station or to a sector through the use of soft handover technology and electrical power control technology is described in Japanese Unexamined Patent Application Publication No. 2005-10821.

SUMMARY OF THE INVENTION

Unfortunately, from the perspective of an entire wireless communication network, all the above-described methods in which hardware does not have a redundant structure force limited operation, in which the number of users who can receive communication services at the same time is reduced significantly or slightly, during software updating. Therefore, of wireless base stations that do not have hardware of redundant structure, a base station with less traffic should be preferably selected for software update work.

However, the task of selecting a base station with less traffic is not easy because a wireless communication network includes many wireless base stations and furthermore, traffic characteristics (for example, the amount of traffic and periods at which traffic increases and decreases) processed by these base stations greatly differ depending on the coverage area, day of the week, date, and time period. For example, traffic will increase at night on weekends in downtown areas, while traffic will increase during the daytime, weekdays, in business districts. It is also probable that traffic will increase at the end of month, such as on a payday and several days after the payday. Furthermore, the average number of users who use communication services by wireless base stations will greatly differ between sparsely populated areas and urban areas. From these considerations, a known method in which a wireless base station with a possibly small number of users receiving communication services, for example, at midnight is selected for software update is problematic because the number of users using communication services at midnight may not be small in downtown areas, and therefore, software update is difficult at midnight for wireless base stations located in downtown areas.

In order to maximize the communication service in the entire wireless communication network, it is preferable that software update in a downtown area be carried out during a time period on a date and a day of the week with the minimum traffic in the downtown area, and similarly, software update in a mountain area be carried out during a time period on a date and a day of the week with the minimum traffic in the mountain area. In short, methods of selecting a wireless base station with a minimum number of users who receive communication services during a certain time period are not always satisfactory. Instead, methods of selecting a date, day of the week, and time period with a minimum number of users who receive communication services in a certain area are more preferable.

In light of these circumstances, an object of the present invention is to provide a wireless-base-station selection method for updating software installed in a wireless base station at a date, day of the week, and time period corresponding to the minimum number of users who receive communication services by the wireless base station covering a certain area. Another object of the present invention is to minimize the influence of software update on communication services provided for users.

One of methods for selecting the date, day of the week, and time period having the minimum number of users who are receiving communication services in a certain area is to refer to statistical information of the past. In a wireless communication network, many of the areas covered by wireless base stations overlap the areas covered by adjacent base stations. For this reason, even if a certain base station suspends communication services, some of the terminals receiving the communication services by that wireless base station may be able to continuously receive the communication services by an adjacent wireless base station. Thus, software update should preferably not be carried out for a certain wireless base station and wireless base stations adjacent thereto at the same time. As described above, due particularly to a huge number of used wireless base stations, it is not easy to select a wireless base station, date, day of the week, and time period having the minimum number of users by taking into consideration both time-series statistical information and geographical conditions of adjacent wireless base stations.

In order to achieve the above-described objects, the present invention focuses attention on the fact that traffic characteristics exhibit a certain regularity with respect to the area, date, day of the week, and time period, as described above. Based on this fact, in the present invention, a network management apparatus acquires statistical information from wireless base stations and classifies the acquired information by wireless base station, day of the week, date, and time period and holds it. Based on the retained statistical information, software-update-work information (span of time, time period in a day) from a maintenance operator, and information about adjacent wireless base stations, the date, day of the week, and time period having the minimum number of users who are receiving communication services by a wireless base station are acquired and then reported to the network management apparatus (or the maintenance person). Furthermore, by using the result of acquisition, the network management apparatus carries out software update autonomously.

A wireless base station according to the present invention is, for example, a wireless base station for performing communication between a wireless terminal and a wired communication network in a wireless communication network. It includes a wireless interface for communication with the wireless terminal; a wired interface for communication with the wired communication network; a communication processing section for performing processing to provide the wireless terminal with a communication service via the wireless interface and the wired interface; and a control section for controlling an apparatus. The control section updates installed software to software received via the wired interface.

A wireless communication network according to the present invention includes, for example, a wireless base station for performing communication between a wireless terminal and a wired communication network; a control apparatus for communicating with the wireless base station; and a network management apparatus for managing the wireless communication network. The wireless base station or the control apparatus reports statistical information about traffic to the network management apparatus. The network management apparatus selects a date and time for software update in a wireless base station using a predetermined rule based on the statistical information about traffic reported from the wireless base station or the control apparatus and software-update-work resource information from a maintenance person (the number of base stations where software update can be performed simultaneously, span of time, and time period in a day) and reports them to the maintenance person. The network management apparatus then transmits update software and an update request to the selected wireless base station at the selected date and time. The wireless base station receives the software and the update request transmitted from the network management apparatus and updates the installed software to the received software according to the received update request.

In another aspect, for example, a wireless communication network includes a wireless base station for performing communication between a wireless terminal and a wired communication network; a control apparatus for performing communication with the wireless base station; and a network management apparatus for managing the wireless communication network. The network management apparatus determines a software-update date and time for the wireless base station based on a predetermined rule from a work plan sent from a maintenance person, statistical information about the wireless base station, and information about an adjacent wireless base station and reports the determined date and time to the maintenance person. It then transmits update software and an update request to the wireless base station at the determined date and time. The wireless base station receives the software and the update request transmitted from the network management apparatus and updates the installed software to the received software according to the received update request.

Each of the above-described network management apparatuses includes, for example, a memory for storing a neighbor identifier for identifying a wireless base station adjacent to the wireless base station concerned in association with an apparatus identifier for identifying the wireless base station concerned. The network management apparatus refers to the memory to identify a wireless base station adjacent to the selected wireless base station so as not to select the adjacent wireless base station for software update performed at the same date and time.

Each of the above-described network management apparatuses includes, for example, a memory for storing the number of call connections occurring in the past in the wireless base station concerned in association with an apparatus identifier for identifying the wireless base station concerned. The network management apparatus refers to the memory and analyzes the number of call connections based on a predetermined rule for each day of the week and time period and each date and time period.

Each of the above-described network management apparatuses includes, for example, a memory for storing the result of analysis of the number of call connections of the past in the wireless base station concerned, for each day of the week and time period and each date and time period, based on a predetermined rule; and a neighbor identifier for identifying a wireless base station adjacent to the wireless base station concerned in association with an apparatus identifier for identifying the wireless base station concerned. The network management apparatus refers to the memory to select a wireless base station and a software-update date and time where the result of analysis of the number of call connections of the past in the wireless base station for each day of the week and time period and each date and time period based on a predetermined rule exhibits the minimum number of processed calls, provided that a wireless base station adjacent to the wireless base station concerned is not selected for software update performed at the same date and time.

Each of the above-described network management apparatuses reports, for example, the selected wireless base station and software-update date and time to the maintenance person before the transmission of a software update request.

A method of selecting a wireless base station for software update in the wireless base station according to the present invention is, for example, a method of selecting a wireless base station in a wireless communication network that includes a wireless base station for performing communication between a wireless terminal and a wired communication network, a control apparatus for communicating with the wireless base station, and a network management apparatus for managing the wireless communication network. This method includes the steps of the network management apparatus analyzing statistical information about traffic reported from the wireless base station or the control apparatus by classifying it for each wireless base station, day of the week, date, and time period; the network management apparatus selecting a date, day of the week, and time period having the minimum number of users who are receiving communication services by the wireless base station according to the statistical information analyzed based on software-update-work resource information (the number of base stations where software update can be performed simultaneously, span of time, time period in a day) from the maintenance person; the network management apparatus reporting the selection result to the maintenance person as a software-update plan; and the network management apparatus transmitting update software and an update request to the selected wireless base station on the date, day of the week, and time period selected according to the selection result.

According to the first solving means of this invention, there is provided a network management apparatus in a wireless communication network, which comprises a wireless base station for performing communication between a wireless terminal and a wired communication network and, the network management apparatus for managing a network, the network management apparatus comprising:

a storage section stored in advance number of calls of connection with the wireless terminal in the wireless base station in association with a date, a day of the week, and a time period; and a processing section for selecting a date and a time period when software is updated in the wireless base station, wherein the processing section inputs a plurality of work dates and time periods when the software is updated in the wireless base station, obtains an n-week average of the numbers of connection calls occurring during each input time period for each day of the week, based on the number of connection calls stored in the storage section, where n is a predetermined integer, obtains an m-month average of the numbers of connection calls occurring during each input time period for each stored date, based on the number of connection calls stored in the storage section, where m is a predetermined integer, calculates an average or a weighted average of the n-week average corresponding to each time period and the day of the week of each input work date and the m-month average corresponding to each time period and each input work date to obtain a degree of impact representing an impact caused by software update upon a communication service, selects a work date and a time period with the minimum degree of impact or with a degree of impact equal to or smaller than a predetermined threshold, and updates the software installed in the wireless base station during the selected time period on the selected work date.

According to the second solving means of this invention, there is provided a method of selecting a wireless base station to update software installed in the wireless base station at a selected time period on a selected date, the method comprising the steps of:

inputting a plurality of work dates and time periods when the software of the wireless base station is updated;

obtaining an n-week average of the numbers of connection calls occurring during each of the input time periods for each day of the week, based on the number of calls of connection with a wireless terminal in the wireless base station, corresponding to each date, day of the week, and time period, where n is a predetermined integer;

obtaining an m-month average of the numbers of connection calls occurring during each of the input time periods for each date, based on the number of connection calls, where m is a predetermined integer;

calculating an average or a weighted average of the n-week average corresponding to each time period and the day of the week of each input work date and the m-month average corresponding to each time period and each input work date to obtain a degree of impact representing an impact caused by software update upon a communication service; and selecting a work date and a time period having the minimum degree of impact.

According to the present invention, a method of selecting a date, day of the week, and time period having the minimum number of users who are receiving communication services be a wireless base station can easily be realized, and therefore, the influence of software update upon the communication services provided for users can be minimized.

BRIEF DESCRIPTION OF THE DRAWINGS

FIGS. 5A and 5B illustrate example screens reporting software-update base-station and date-and-time selection-results.

FIG. 8 illustrates one example of a result of the statistical information analysis for each day of the week, for selecting a base station for software update.

FIG. 10 illustrates one example of a result of the statistical information analysis for each date, for selecting a base station for software update.

FIGS. 11A and 11B illustrate example results of integration of the day-of-the-week statistical information analysis and the date-based statistical information analysis, for selecting a base station for software update.

FIG. 13 illustrates an example table of selecting base stations and dates and times for software update.

FIG. 14 illustrates a resultant table of selecting base stations and dates and times for software update.

DESCRIPTION OF THE PREFERRED
EMBODIMENTS OF THE INVENTION

The structures of wireless base stations and a wireless communication network and a method of selecting a wireless base station for software update among the wireless base stations according to an embodiment of the present invention will be described below with reference to the drawings.

Figure 1:
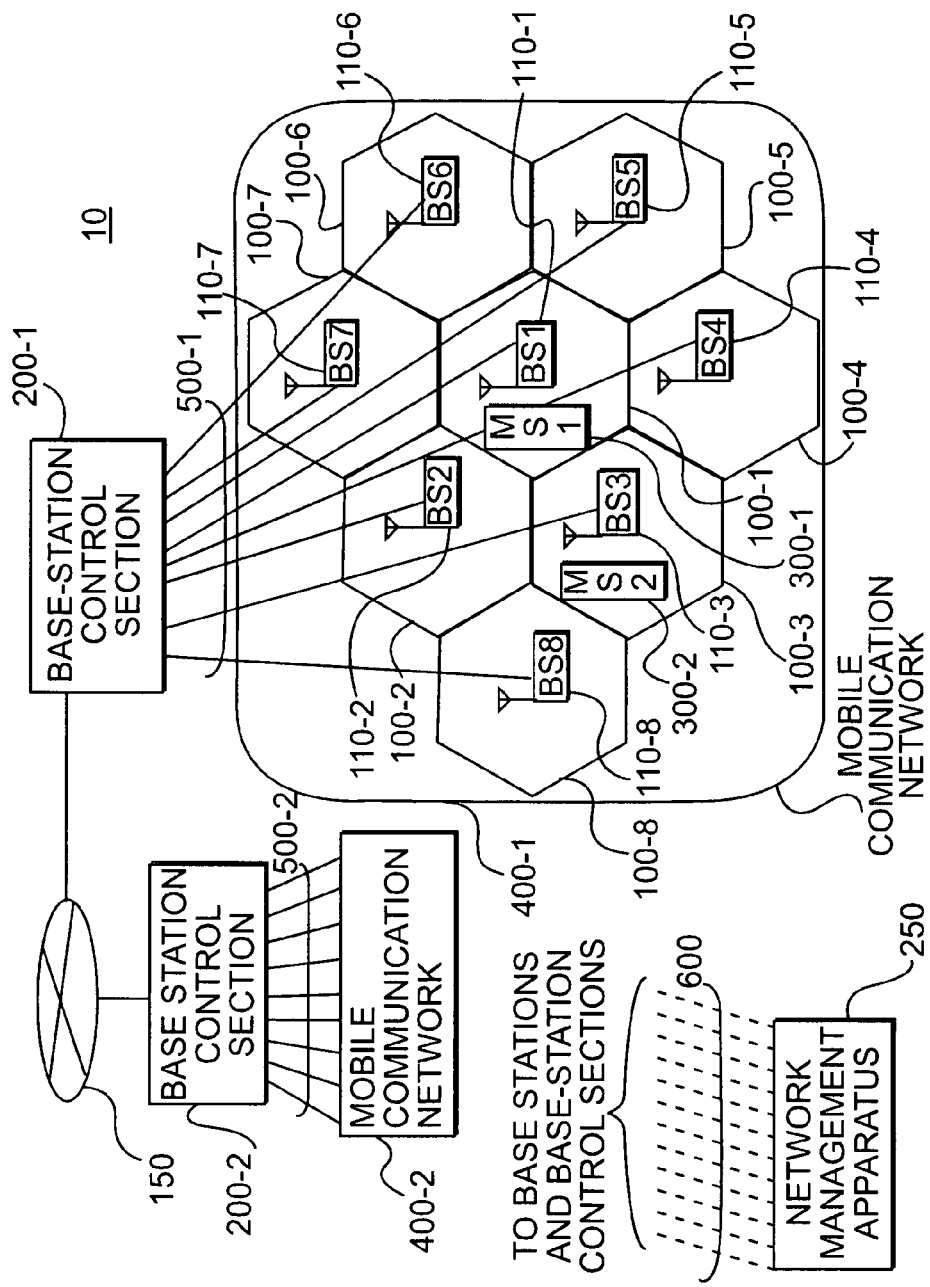
FIG. 1 is a block diagram depicting the structure and an example operation of a wireless communication network.

FIG. 1 is a block diagram depicting an example structure of a wireless communication network to which this embodiment is applied. A wireless communication network 10 has the following structure to allow communication between terminals.

A plurality of mobile terminals MS1 300-1 and MS2 300-2 are connected to a plurality of wireless communication apparatuses (hereinafter, referred to as base stations) BS1 110-1 to BS8 110-8 via wireless communication paths (not shown in the figure). More specifically, radio-wave coverage areas called cells 100-1 to 100-8 are defined for the base stations BS1 to BS8 to allow wireless communication with terminals MS, for example, by using CDMA. In this embodiment, areas in which these base stations BS1 110-1 to BS8 110-8 can communicate with terminals MS are called a mobile communication network 400.

Each of the base stations BS1 110-1 to BS8 110-8 in a mobile communication network 400-1 is connected to a base-station control section (control apparatus) 200-1 via communication paths 500-1. When the destination terminal of a call sent from the terminal MS1 300-1 exists in the same mobile communication network 400-1, the base-station control section 200-1 returns the signal to one of the subordinate base stations BS1 110-1 to BS8 110-8 to communicate with the destination terminal MS. On the other hand, when the destination terminal is located in another mobile communication network 400-2 (the structure thereof is similar to that of the mobile communication network 400-1, and thus a description thereof will be omitted here), the base-station control section 200-1 communicates with the destination terminal by using a base-station control section 200-2 and the mobile communication network 400-2 to send and receive signals via a communication network 150 connecting the base-station control sections 200. The communication network 150 can be realized by a public network, a leased line network, or a private network. In addition, the mobile communication network 400-2 can be realized by a so-called fixed network including a wired communication network and terminals stationarily connected thereto.

A network management apparatus 250 is connected to base stations BS 110 and base-station control sections 200 provided for the communication network 10 via a control-signal communication paths 600 for transmitting and receiving control signals, such as monitoring and maintenance signals, to manage and control the entire facility of the communication network 10. For example, the network management apparatus 250 selects a base station 110 for which software is to be updated and outputs a software-update instruction to the base station 110. The communication network 10 can include any appropriate numbers of base stations BS 110, base-station control sections 200, and network management apparatuses 250. The numbers are not limited to those shown in FIG. 1.

Figure 2:
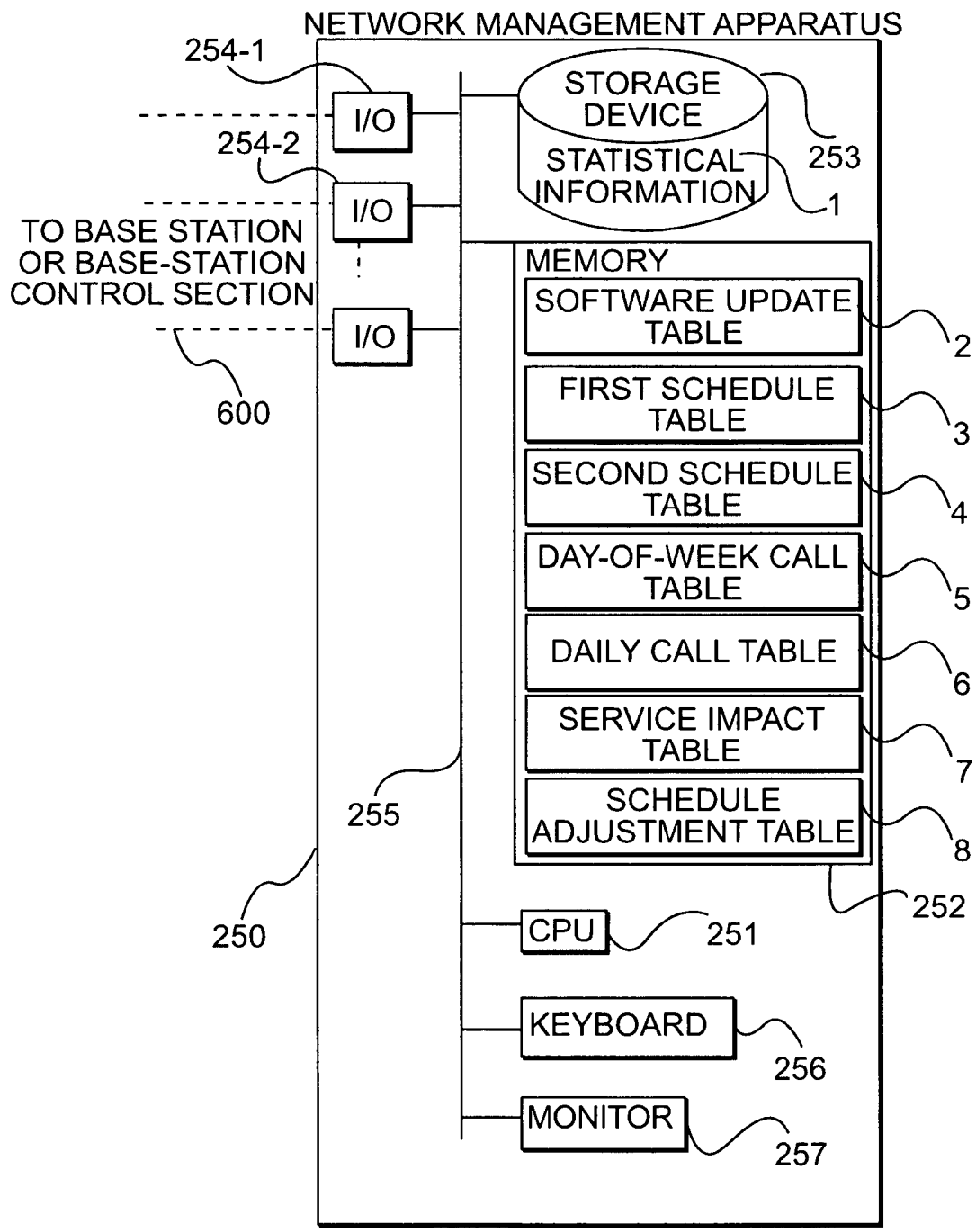
FIG. 2 is a block diagram showing an example structure of a network management apparatus.

FIG. 2 is a block diagram showing an example structure of the network management apparatus 250. The network management apparatus 250 has the following structure and communicates with the base stations 110 or the base-station control sections 200 via the control signal communication paths 600 to control these components.

The network management apparatus 250 manages maintenance and operation of the whole of the wireless communication network 10, including a plurality of mobile communication networks 400 each accommodating a plurality of base stations 110. More specifically, the network management apparatus 250 includes, for example, a plurality of input and output (I/O) interfaces 254, a CPU 251, a memory 252, a storage device 253, an input section such as a keyboard 256, and a display section such as a monitor 257, and these components are interconnected via an internal bus 255.

The storage device 253 stores statistical information 1 such as the number of connection calls in a wireless base station. The memory 252 stores tables used to select base stations for software update. Tables stored in the memory 252 include, for example, a software update table 2, a first schedule table 3, a second schedule table 4, a day-of-week call table 5, a daily call table 6, a service impact table 7, and a schedule adjustment table 8. Details of each table will be described later. The statistical information 1 may be stored in the memory 252 or input from an external storage device.

Each I/O interface 254 functions as a communication interface with the base stations 110 and the base-station control sections 200 provided for the wireless communication network 10. The CPU 251 controls the entire network management apparatus 250 to carry out maintenance operation of the entire mobile communication networks 400, including the base stations 110, by transmitting and receiving control signals (commands and other information) and data via the I/O interfaces 254.

The memory 252 stores, for example, programs executed by the CPU 251. The storage device 253 stores data (for example, information about terminals and base stations) necessary for the network management apparatus 250 to operate the wireless communication network 10 and software and firmware which are to be updated at the base stations 110. The keyboard 256 is input means for inputting instructions, for example, by a maintenance person, and the monitor 257 is display means for reporting, for example, the operating state of the wireless communication network 10 and software update information at the base stations 110 to the maintenance person. Appropriate means, apparatuses, and devices can be used as input means and output means.

The network management apparatus 250 periodically acquires information, such as the number of users receiving communication services, of each base station 110, from that base station 110 or the corresponding base-station control section 200 and stores the information in the memory 252 or the storage device 253. Furthermore, the network management apparatus 250 stores in the storage device 253 software and firmware to be updated, according to an instruction from, for example, the maintenance person and then assists in the selection of a date, a day of the week, and a time period for software update in the base station 110 and actual software update at the base station 110 according to the procedure described below.

Figure 3:
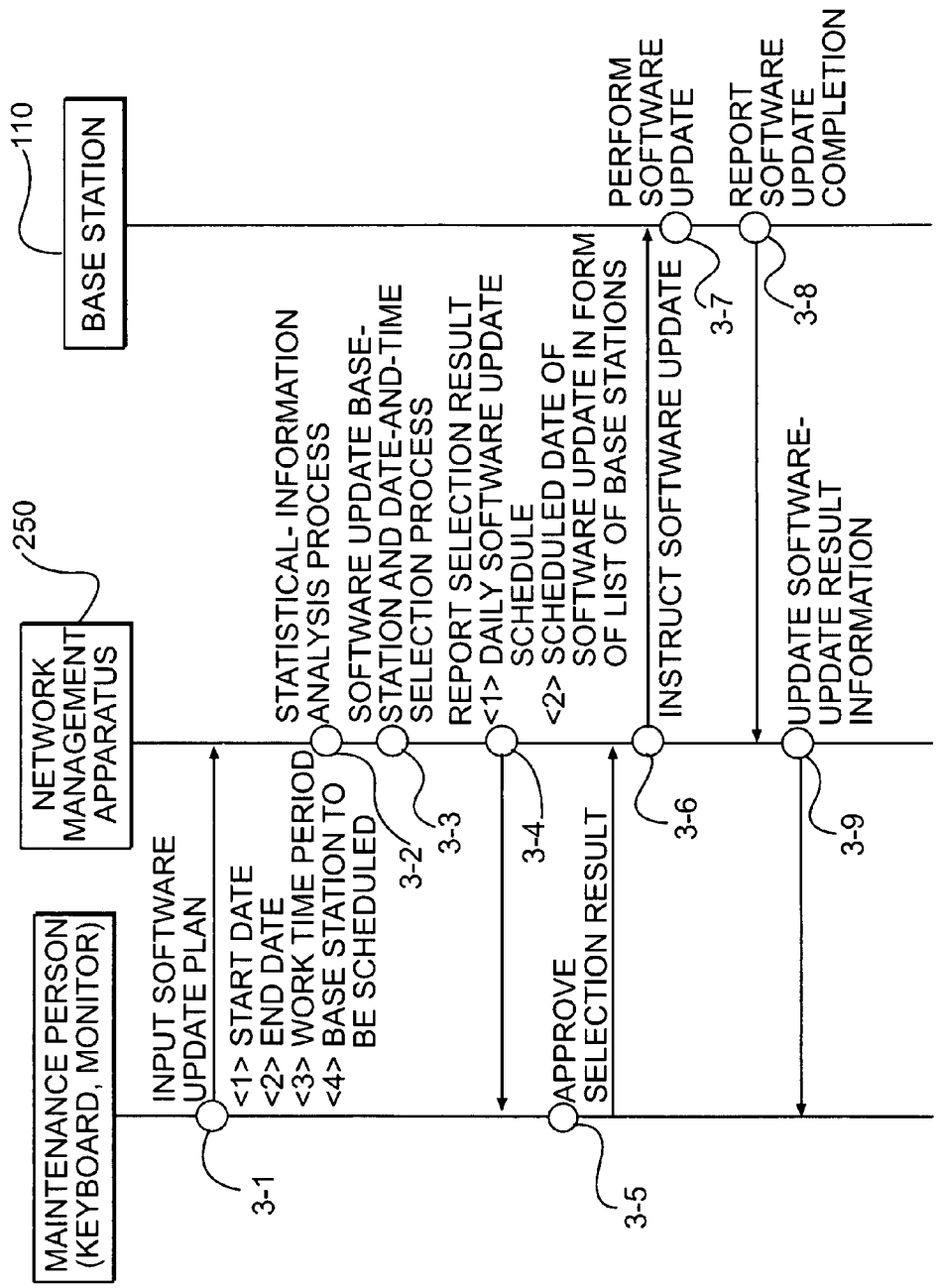
FIG. 3 is a diagram for describing an example software update operation.

FIG. 3 is a sequence diagram showing a workflow associated with software update in each base station 110 according to this embodiment. The maintenance person carries out software-update-plan inputting (in step 3-1) into the network management apparatus 250. For example, the network management apparatus 250 inputs a software-update plan via the keyboard operated by the maintenance person. The plan includes a "software-update start date," a "software-update end date," a "work time period," and a "base station to be scheduled." Software-update work dates are determined with the input "software-update start date" and "software-update end date." Alternatively, software-update work dates may be specified by appropriate means. For example, they may be input directly, or they may be selected non-consecutively.

Figure 4:
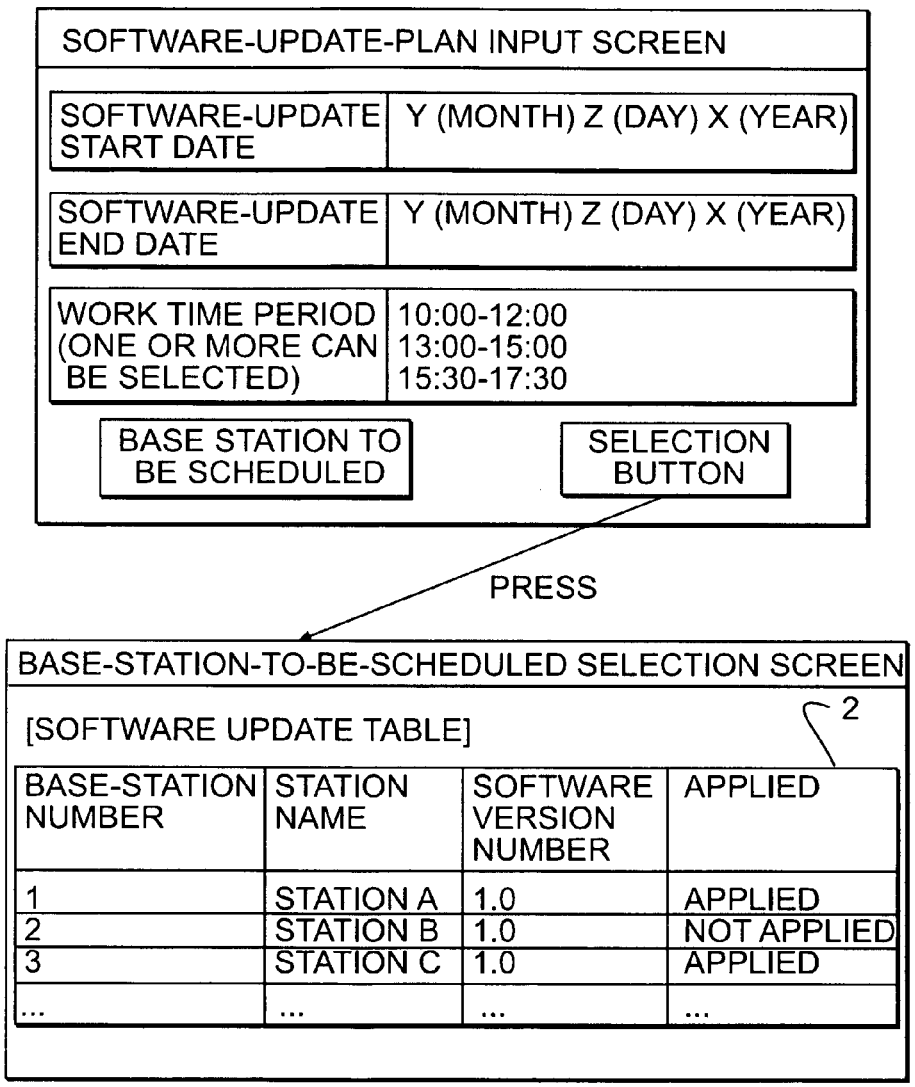
FIG. 4 illustrates one example of a software-update-plan input screen.

FIG. 4 shows an example input screen displayed on the monitor 257 of the network management apparatus 250 in a process of software-update-plan inputting (in step 3-1). Various items of information are input on this screen. In order to specify a "base station to be scheduled," a selection button may be pressed to make reference to the software update table 2 to display various items of information including "base-station numbers," "station names," "software version numbers," and "applied/not applied", as shown in FIG. 4, so that the maintenance person can select whether scheduling of each base station is "applied" or "not applied."

When the selected software-update plan is input, the network management apparatus 250 carries out a statistical-information analysis process (in step 3-2) and then carries out a software-update base-station and date-and-time selection process (in step 3-3). Each of the processes (in steps 3-2 and 3-3) will be described later in detail. In addition, the network management apparatus 250 carries out selection result reporting (in step 3-4) to the maintenance person. Selection result reporting is made to the maintenance person by displaying on the monitor 257 a daily software update schedule and scheduled dates of software update in the form of a list of base stations.

FIGS. 5A and 5B show example screens of selection result reporting. In the current description, a table that includes "scheduled date," "base-station number," "station name," "software version number," "approved/not approved," and "date of notification," which is displayed on a "software-update base-station and date-and-time selection-result report screen 1" of FIG. 5A, is referred to as the first schedule table 3. Furthermore, in the current description, a table that includes "base-station number," "station name," "software version number," "applied/not applied," "scheduled date," "approved/not approved," and "date of notification," which is displayed on a "software-update base-station and date-and-time selection-result report screen 2" of FIG. 5B, is referred to as the second schedule table 4. It is acceptable to report and display only one of the schedule tables or to report and display both the schedule tables. The maintenance person checks the base stations and dates and times for software update, and when the reported schedule is acceptable, carries out selection result approval (in step 3-5). For example, the network management apparatus 250 inputs a predetermined item of information and a signal indicating approval via input means such as the keyboard 256. The selection result approval (in step 3-5) can be carried out for one base station, a plurality of base stations simultaneously, or all base stations to be scheduled, simultaneously. On the other hand, if the selection result is not acceptable because, for example, base-station works conflicting with a reported software update schedule have been determined suddenly, it is possible not to approve the selection result for the adversely affected base stations 110, the approval of the adversely affected base stations 110 can be canceled, or the schedule can be modified at the software-update-plan inputting (in step 3-1). In this case, the base stations for which the selection result is not approved or for which the approval of the selection result is canceled can be excluded from the candidates before starting again the process (in step 3-1) and the subsequent processes.

Based on the above-described selection result, a software update instruction is issued (in step 3-6) by the network management apparatus 250 to the base stations 110 whose selection results have been approved with respect to the selected dates and times. When each of the relevant base stations 110 receives the issued software update instruction, it carries out software update (in step 3-7). The software update (in step 3-7) in the base station 110 can be carried out while communication services are stopped, as described in Japanese Unexamined Patent Application Publication No. Hei-10-63498, or while the communication services are switched therefrom to another base station 110, as described in Japanese Unexamined Patent Application Publication No. 2005-10821. Other methods can also be used. When the software update is completed (in step 3-7), the base station 110 transmits a software update completion report to the network management apparatus 250 (in step 3-8). In response, the network management apparatus 250 carries out software-update-result-information update (in step 3-9). For example, the network management apparatus 250 records the date when the software update completion report was received (date of notification) in the first schedule table 3 and the second schedule table 4 in association with the base-station number of the base station from which the software update completion report was received. Software update completion by the base station 110 is reported to the maintenance person as shown, for example, in "date of notification" of FIG. 5.

Next, the statistical-information analysis process (in step 3-2) in FIG. 3 will be described in detail. Based on the fact that user traffic is correlated with information such as the coverage area of the base station 110, date, day of the week, and time period, the network management apparatus 250 classifies statistical information acquired in the past, such as the number of users who receive communication services (hereinafter, referred to as the number of connection calls), by date, day of the week, and time period for each base station 110 planned for software update to analyze the statistical information. A specific method for carrying out this analysis is described with reference to FIGS. 6 to 10.

Figure 6:
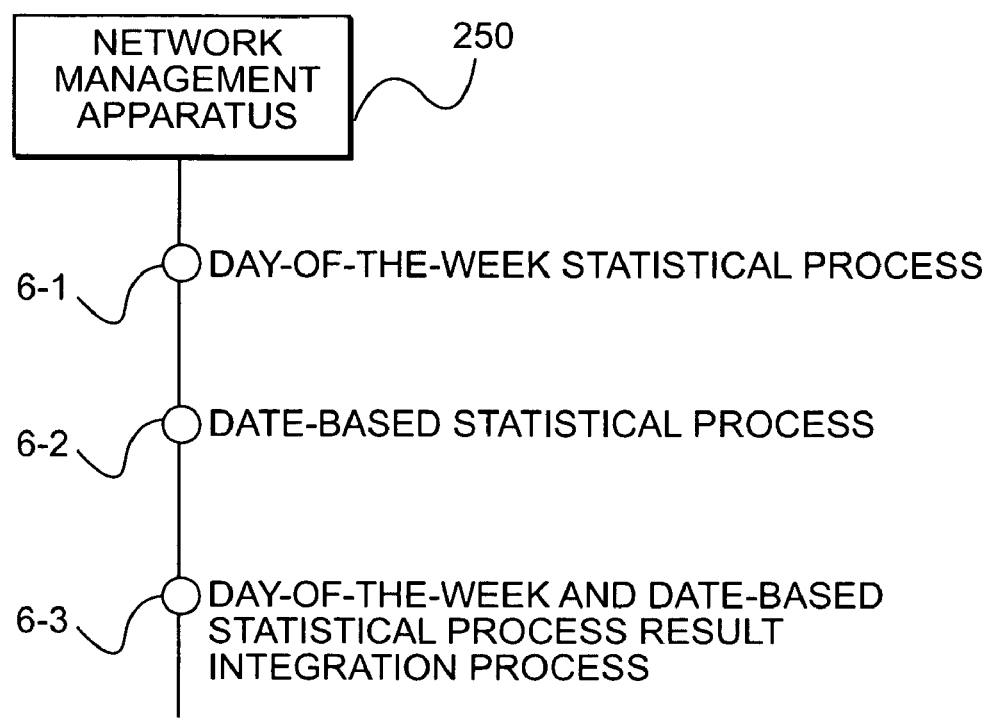
FIG. 6 is a diagram showing an example of statistical information analysis for selecting a base station for software update.

FIG. 6 is a diagram depicting a flow of the statistical-information analysis process (in step 3-2). First, the network management apparatus 250 carries out a day-of-the-week statistical process (in step 6-1), which is a process of arranging statistical information of the past by the day of the week. Thereafter, the network management apparatus 250 carries out a date-based statistical process (in step 6-2), which is a process of arranging statistical information of the past by the date, and then integrates day-of-the-week and date-based statistical process results (in step 6-3).

Figure 7:
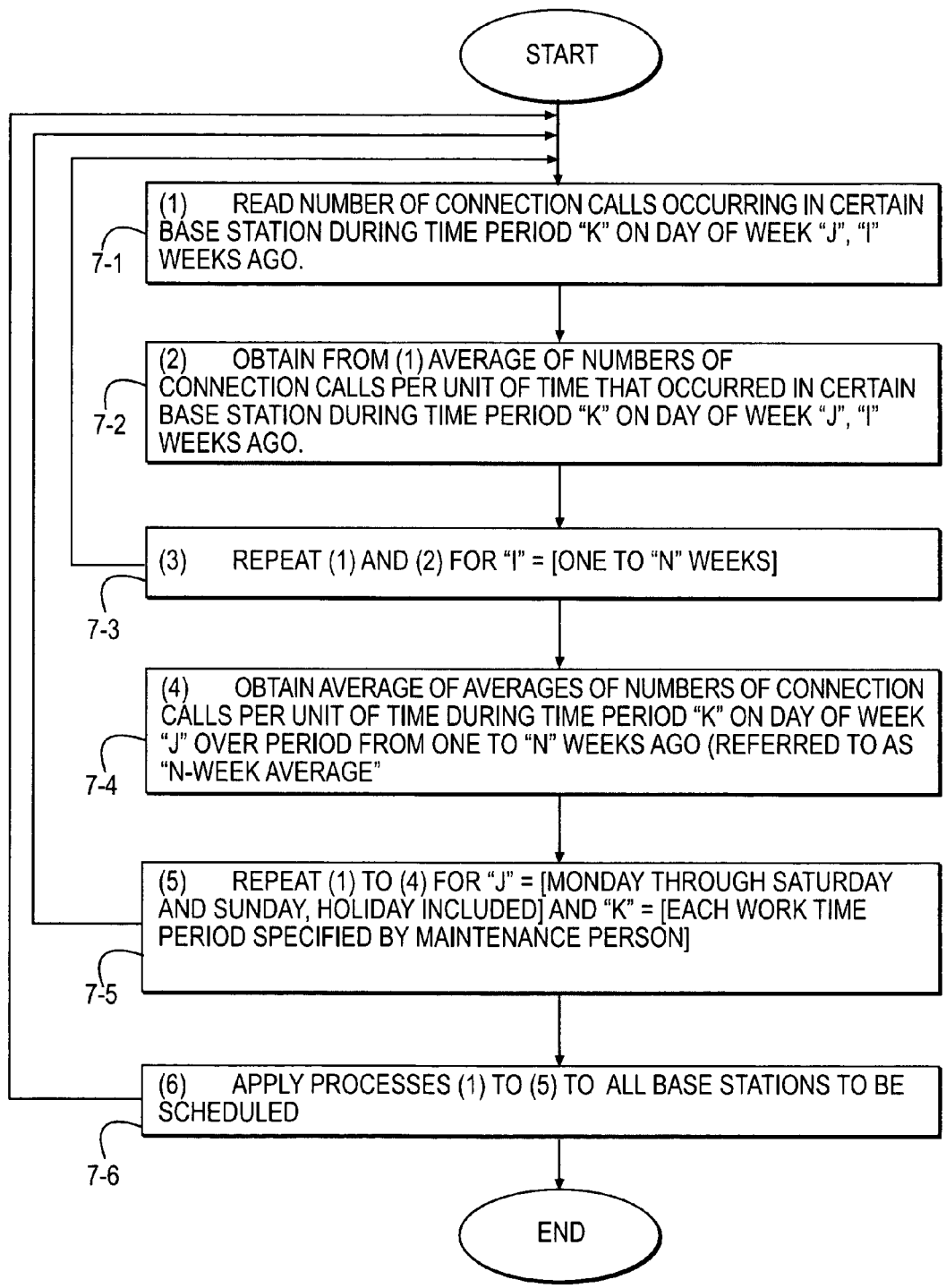
FIG. 7 is a flowchart illustrating an example of statistical information analysis for each day of the week, for selecting a base station for software update.

FIG. 7 shows a flowchart of the day-of-the-week statistical process (in step 6-1). It is noted that information in the past n weeks (n is a predetermined integer) can be used for statistical information used in the day-of-the-week statistical process (in step 6-1). FIG. 8 shows the day-of-week call table 5, which contains the result of a day-of-the-week statistical process performed for a certain base station according to the flow shown in FIG. 7. Although the averages of the numbers of connection calls from one to n weeks ago are indicated by integers in FIG. 8, they can be indicated by decimals. The day-of-week call table 5 may be provided for each base station to be scheduled.

In the day-of-the-week statistical process (in step 6-1), the network management apparatus 250 carries out a process of "reading from statistical information stored in the storage device 253 the number of connection calls occurring in a certain base station during a time period "k" on a day of the week "j", "i" weeks ago" (in step 7-1), where "i" is a value from one to n, "j" is identification information indicating Monday through Saturday and Sunday (holidays may be included), and "k" is identification information indicating a work time period specified by the maintenance person (each of three time periods "10:00-12:00," "13:00-15:00," and "15:30-17:30" in the case of FIG. 4). The number of connection calls stored as statistical information in the storage device 253 of the network management apparatus 250 is periodically acquired at certain time intervals; for example, the number of connection calls is stored every five minutes. For this reason, the number of connection calls during a time period k can be stored in the form of a sequence including a plurality of terms.

If it is assumed that the number of connection calls is stored in the network management apparatus 250, for example, every five minutes, the numbers of connection calls during the time period 10:00-12:00 are expressed as a sequence of 24 terms each indicating the number of connection calls, such as a sequence of 24 terms "10, 7, 5, 6, 8, 9, 11, 9, 5, 7, 10, 9, 8, 6, 9, 9, 10, 8, 12, 8, 7, 5, 9, 9." Such a sequence is stored in the storage device 253 in association with, for example, a certain date, day of the week, and time period. The sequences may be not stored in association with the day of the week. In that case, reference is made to an appropriate calendar in the apparatus to obtain the day of the week corresponding to each date. Alternatively, the average of the numbers of connection calls over every predetermined period, such as from 10:00 to 12:00, may be stored.

The network management apparatus 250 carries out a process of averaging these sequences by a unit time (hour or minute) by performing a process of "obtaining, from the read numbers of connection calls, the average of the numbers of connection calls per unit of time that occurred in a certain base station during a time period "k" on a day of the week "j", "i" weeks ago" (in step 7-2). For example, the numbers of connection calls (for example, 24) which have been read from the data corresponding to a day of the week "j", "i" weeks ago are averaged, and the averaged number of connection calls is then stored in the day-of-week call table 5 such that it is associated with the corresponding week, day of the week, and time period. The network management apparatus 250 performs a process of "repeating the above-described processes (in steps 7-1 and 7-2) for i=[one to n weeks]" (in step 7-3) to obtain the average of the numbers of connection calls occurring in a certain base station during a time period "k" on a day of the week "j" for each week from one to n weeks ago.

Next, the network management apparatus 250 obtains an "n-week average" (as defined below) for a day of the week "j" and a time period "k" in a certain base station by carrying out a process of "obtaining the average of the averages of the numbers of connection calls per unit of time, during a time period "k" on a day of the week "j", over the period from one to n weeks ago (referred to as the "n-week average")" (in step 7-4). In addition, the obtained n-week average is stored in the day-of-week call table 5 such that it is associated with the corresponding day of the week and time period. The network management apparatus 250 obtains the "n-week average" in a certain base station for all time periods on all days of the week by carrying out a process of "repeating the above-described processes (in steps 7-1 to 7-4) for "j"=[Monday through Saturday and Sunday (holidays may be included)] and "k"=[work time periods specified by the maintenance person]" (in step 7-5). Furthermore, the network management apparatus 250 obtains the "n-week average" for all days of the-week and all time periods in all base stations to be scheduled by carrying out a process of "applying the above-described processes (in steps 7-1 to 7-5) to all the base stations to be scheduled" (in step 7-6).

Figure 9:
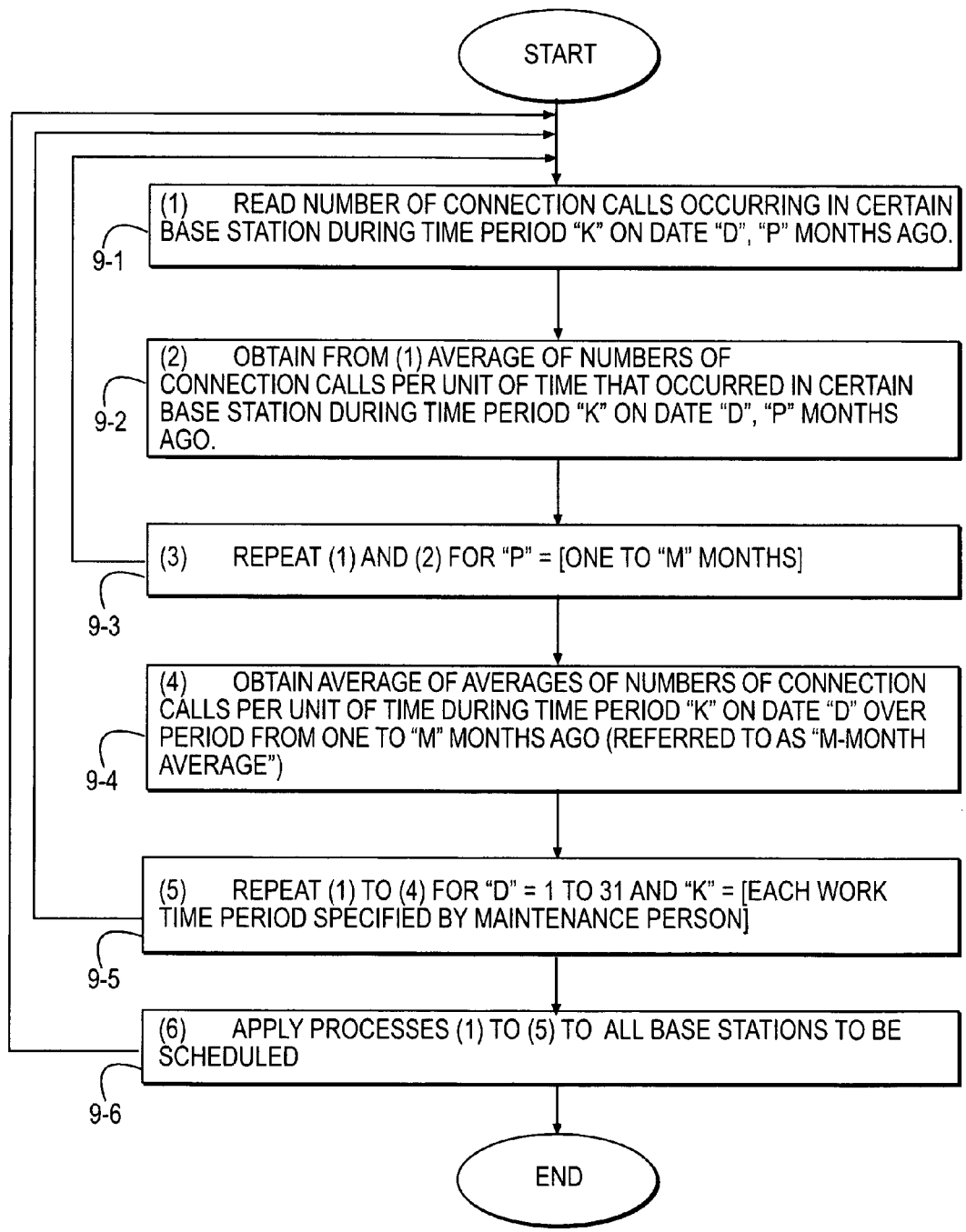
FIG. 9 is a flowchart illustrating an example of statistical information analysis for each date, for selecting a base station for software update.

FIG. 9 shows a flowchart for the date-based statistical process (in step 6-2). It is noted that information in the past m months (m is a predetermined integer) can be used for statistical information used in the date-based statistical process (in step 6-2). FIG. 10 shows the daily call table 6, which contains the result of a date-based statistical process performed according to the flow shown in FIG. 9. Although each average of the numbers of connection calls and each m-month average are indicated by integers in FIG. 10, they may be indicated by decimals. One daily call table 6 may be provided for each base station to be scheduled.

In the date-based statistical process (in step 6-2), the network management apparatus 250 carries out the process of "reading the number of connection calls occurring in a certain base station, during a time period "k" on a date "d", "p" months ago" (in step 9-1), where "p" is a value from one to m, "d" is a value from 1 to 31, and "k" is identification information indicating a work time period specified by the maintenance person (each of three time periods "10:00-12:00," "13:00-15:00," and "15:30-17:30" in the case of FIG. 4). The number of connection calls stored as statistical information in the network management apparatus 250 is periodically acquired at certain time intervals as described above; for example, the number of connection calls is stored every five minutes. For this reason, the number of connection calls during a time period "k" can be stored in the form of a sequence including a plurality of terms. If it is assumed that the number of connection calls is stored in the network management apparatus 250, for example, every five minutes, the numbers of connection calls during the time period 10:00-12:00 are expressed as a sequence of 24 terms each indicating the number of connection calls. The network management apparatus 250 carries out a process of averaging these sequences by a unit time (hour or minute) by performing a process of "obtaining, from the read numbers of connection calls, the average of the numbers of connection calls per unit of time that occurred in a certain base station during a time period "k" on a date "d", "p" months ago" (in step 9-2). For example, the numbers of connection calls which have been read through the process (in step 9-1) are averaged, and the average of the numbers of connection calls is then stored in the daily call table 6 such that it is associated with the corresponding month, date, and time period. The network management apparatus 250 performs a process of "repeating the above-described processes (in steps 9-1 and 9-2) for "p"=[one to m months]" (in step 9-3) to obtain the average of the numbers of connection calls occurring in a certain base station during a time period "k" on a date "d" for each month from one to m months ago.

Next, the network management apparatus 250 obtains an "m-month average" (as defined below) for a date d and a time period k in a certain base station by carrying out a process of "obtaining the average of the average of the numbers of connection calls per unit of time during a time period "k" on a date "d", over the period from one to m months ago (referred to as the "m-month average")" (in step 9-4). In addition, the network management apparatus 250 stores the obtained m-month average in the daily call table 6 such that it is associated with the corresponding date and time period. The network management apparatus 250 obtains the "m-month average" in a certain base station for all time periods on all dates by carrying out a process of "repeating the above-described processes (in steps 9-1 to 9-4) for "d"=1 to 31 and "k"=[each work time period specified by the maintenance person]" (in step 9-5). Furthermore, the network management apparatus 250 obtains the "m-month average" for all the dates and all the time periods in all the base stations to be scheduled by carrying out a process of "applying the above-described processes (in steps 9-1 to 9-5) to all the base stations to be scheduled" (in step 9-6).

Next, in the "process of integrating day-of-the-week and date-based statistical process results" (in step 6-3) of FIG. 6, the "n-week average" stored in the day-of-week call table 5 of FIG. 8 and the "m-month average" stored in the daily call table 6 of FIG. 10 are integrated for each base station by weighting them by the respective numbers of samples (by obtaining the weighted average). In this manner, the influence upon communication services for users (hereinafter, referred to as the degree of impact) is represented in a numerical form, classified by date, day of the week, time period. More specifically, the network management apparatus 250 calculates the degree of impact by the following expression:

Degree of impact={($n$×[$n$-week average])+($m$×[$m$-month average])}/($n+m$)

For example, the degree of impact is calculated for each base station, each input work date, and each time period. Furthermore, the network management apparatus 250 stores the obtained degree of impact in the service impact table 7 such that it is associated with the corresponding date, day of the week, and time period. The day of the week can be obtained based on the date by referring to an appropriate calendar inside or outside the apparatus.

For example, if software update is planned at "10:00-12:00 on the second day, Monday," the influence upon communication services for users at "10:00-12:00 on the second day, Monday" is calculated as (1.5n+3m)/(n+m) because the "n-week average" at 10:00-12:00 on Monday is "1.5" according to FIG. 8 and the "m-month average" at 10:00-12:00 on the second day is "3" according to FIG. 10. The network management apparatus 250 calculates the influence on communication services in a numerical form for all time periods and all dates from the software-update start date to the end date.

FIGS. 11A and 11B show examples of the service impact table 7. The service impact table 7 stores the degree of impact upon communication services for users in each base station, classified according to date, day of the week, and time period. In the examples of FIGS. 11A and 11B, the lowest influence upon communication services for users is seen at 10:00 to 12:00 on September 2 (Monday) (degree of impact is 1.6) for base-station number 1 and is seen at 13:00 to 15:00 on September 2 (Monday) (the degree of impact is 9.4) for base-station number 2.

In the "process of integrating day-of-the-week and date-based statistical process results" (in step 6-3), the influence upon communication services for users can be expressed in a numerical form, classified by date, day of the week, and time period, with an emphasis placed upon either day of the week or date, by multiplying the day of the week and the date by predetermined weights "a" and "b", respectively, (obtaining the weighted average) based on the expression below.

{($a$×$n$×[$n$-week average])+($b$×$m$×[$m$-month average])}/($n+m$)

Next, the software-update base-station and date-and-time selection process (in step 3-3) in FIG. 3 will be described. In the wireless communication network 10, many of the coverage areas of the base stations 110 overlap with those of adjacent base stations. Therefore, even if a certain base station 110 stops communication services, some of the terminals 300 receiving communication services from that base station 110 can receive the communication services from an adjacent base station in some cases. For this reason, the chance of interrupting communication services can be reduced by avoiding carrying out software update in a certain base station and base stations adjacent thereto simultaneously. In the software-update base-station and date-and-time selection process (in step 3-3), a base station, a date, a day of the week, and a time period for software update are selected based on the degree of impact upon communication services for users obtained through the statistical-information analysis process (in step 3-2) and predetermined information about adjacent base stations.

Figure 12:
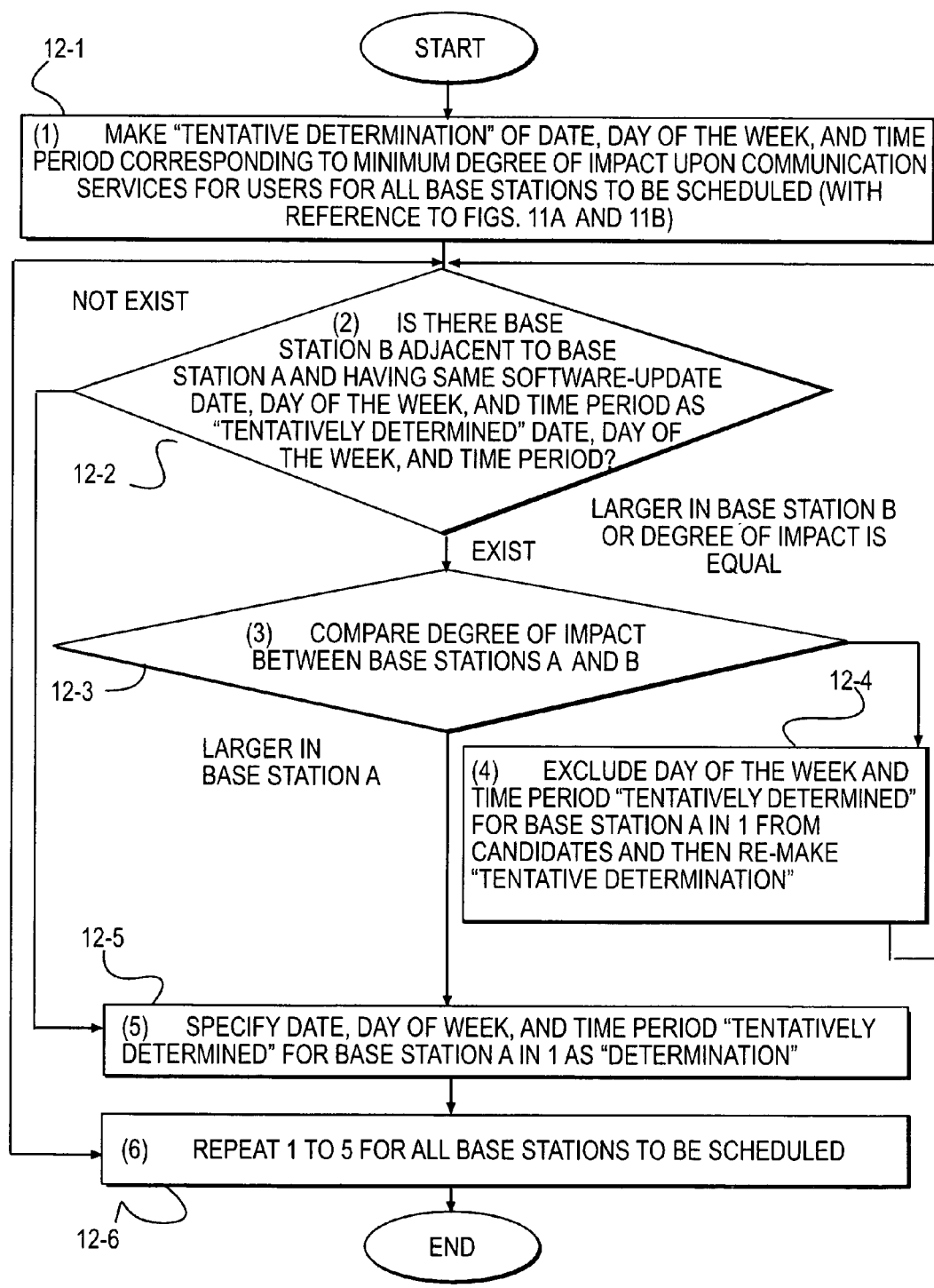
FIG. 12 is a flowchart illustrating an example of selecting base stations and dates and times for software update.

FIG. 12 shows a specific processing flow of the software-update base-station and date-and-time selection process (in step 3-3). FIG. 13 shows an example structure of the schedule adjustment table 8. The schedule adjustment table 8 includes, for example, "base-station number," "degree of impact upon communication services for users," "adjacent base-station number," "software update schedule," and "tentative determination/determination."

In FIG. 12, the network management apparatus 250 performs a process of "making a tentative determination of the date, the day of the week, and the time period corresponding to the minimum degree of impact upon communication services for users for all base stations to be scheduled" selected on the base-station-to-be-scheduled selection screen shown in FIG. 4 (in step 12-1). In this process, the network management apparatus 250 refers to the service impact table 7 shown in FIGS. 11A and 11B to select the date, the day of the week, and the time period having the minimum degree of impact upon communication services for users in each base station. The network management apparatus 250 specifies the selected date, day of the week, and time period as a "software update schedule" in the schedule adjustment table 8. Furthermore, the degree of impact upon communication services for users, corresponding to the selected date, day of the week, time period is set, and "tentative determination" is set in the "tentative determination/determination" field.

Next, with respect to a certain base station A to be scheduled for software update, a process of "determining whether there is a base station B adjacent to the base station A and having the same software update date, day of the week, and time period as the tentatively determined date, day of the week, and time period" is performed (in step 12-2). For example, the network management apparatus 250 refers to the schedule adjustment table 8 to acquire the base-station numbers (for example, 1, 3, 7, 8 . . . ) of the base stations adjacent to the base station corresponding to the base-station number to which the process is applied (for example, base-station number 2). Thereafter, the network management apparatus 250 searches the schedule adjustment table 8 for the acquired adjacent base-station numbers and reads the software update schedule corresponding to each of the acquired base-station numbers. The network management apparatus 250 determines whether the software update schedule (for example, at 13:00-15:00 on September 2 (Monday)) of the base-station number to which the process is applied (for example, base-station number 2) conflicts with the time period of the acquired software update schedule.

In the case of FIG. 13, the time period of the software update schedule for base-station number 1 does not conflict with any of the time periods of the software update schedules for base-station numbers 2, 3, 4, 6, and 7, which are the numbers of base stations adjacent to the base station with base-station number 1. Therefore, the determination result in the process (in step 12-2) is "not exist." On the other hand, since the time period of the software update schedule for base-station number 2 conflicts with the time period of the software update schedule for base-station number 7, which is the one of the numbers of the base stations adjacent to the base station with base-station number 2, the determination result in the process (in step 12-2) is "exist." When the determination result in the process (in step 12-2) is "not exist," the tentatively determined date, day of the week, and time period are adopted, and a process of "specifying the date, day of the week, and time period tentatively determined for the base station A in the process (in step 12-1) as determination" (in step 12-5) is carried out. More specifically, "tentative determination" is changed to "determination" in the "tentative determination/determination" field. On the other hand, if the determination result in the process (in step 12-2) is "exist," the network management apparatus 250 carries out a process of "comparing the degree of impact upon communication services for users between the base stations A and B" (in step 12-3).

If priority is given to the date, day of the week, and time period related to the base station having the lower degree of impact in the process (in step 12-3), it is unavoidable for the base station having the higher degree of impact to select a date, day of the week, and time period that will cause an even higher degree of impact. In short, it is expected that the degree of impact will vary greatly among the base stations. To overcome this drawback, that is, to prevent the degree of impact from varying greatly among the base stations, the date and day of the week related to the base station having the higher degree of impact are selected with priority in subsequent processes.

When it is determined in the process (in step 12-3) that the degree of impact of the base station A is higher, the tentatively determined date, day of the week, and time period are adopted, and the process of "specifying the date, day of the week, and time period tentatively determined for the base station A in the process (in step 12-1) as determination" (in step 12-5) is carried. On the other hand, when it is determined in the process (in step 12-3) that the degree of impact of the base station B is higher or that the degree of impact is the same between the base station A and the base station B, a process of "excluding the date, day of the week, and time period tentatively determined for the base station A in the process (in step 12-1) from the candidates and then re-making a "tentative determination" of a date, day of the week, and time period with a minimum degree of impact upon communication services for users for the base station A" (in step 12-4) is carried out. Then, the process (in step 12-2) is carried out again.

The network management apparatus 250 repeats the processes (in steps 12-1 to 12-5) for the base stations to be scheduled (process (in step 12-6)) until all cells in the "tentative determination/determination" fields of FIG. 13 are set to "determination." In this manner, the date and time period of schedule for software update are established for all base stations to be scheduled.

FIG. 13 shows the table 8 which reflects the state obtained while the process (in step 12-3) of FIG. 12 is being applied to the base-station number 2. Referring to FIG. 13, the base station with base-station number 7 is adjacent to the base station with base-station number 2, and furthermore, the date, day of the week, and time period for software update of the base-station number 2 matches those of the base-station number 7. In addition, the base-station number 7 has the higher degree of impact upon communication services for users. In short, the determination result in the process (in step 12-2) is "exist" and the determination result in the process (in step 12-3) is "base station B has higher degree of impact." In this case, the process of "excluding the date, day of the week, and time period tentatively determined for software update for the base-station number 2 from the candidates and re-making a tentative determination" (in step 12-4) is carried out. Referring to the service impact table 7 for base-station number 2 in FIG. 11B, "10:00-12:00 on September 2 (Monday)", which was selected before, is excluded, and therefore "13:00-15:00 on September 1 (Sunday)" can be "tentatively determined" as the date, day of the week, and time period for software update for base-station number 2.

In the above-described embodiment, simultaneous software update both in a base station and an adjacent base station is not allowed. It is also acceptable to perform simultaneous software update in up to N adjacent base stations. This can be achieved by changing the process (in step 12-2) to a process of "determining whether there are N or more base stations adjacent to the base station A and having the same software-update date, day of the week, and time period as those tentatively determined."

FIG. 14 shows the schedule adjustment table 8 obtained when the processing of FIG. 12 is completed. The date, day of the week, and time period for software update for base-station number 2 have been re-scheduled as described with reference to FIG. 13, and the base station with base-station number 2 is scheduled for software update at 13:00 to 15:00 on September 1 with a degree of impact upon communication services for users of 9.8. According to FIGS. 11A and 11B, the degree of impact upon communication services for users of base-station number 1 at 13:00 to 15:00 on September 1 is 2.4, which is smaller than that of base-station number 2. If priority for software update is determined simply "in ascending order of the degree of impact upon communication services for users," priority is given to base-station number 1 for software update during the period 13:00 to 15:00 on September 1. Therefore, software update for the base-station number 2 is not carried out during the period 13:00 to 15:00 on September 1. This causes software update for base-station number 2 to be carried out during a time period on a date with a higher degree of impact upon communication services for users. As described above, according to the method of selecting a base station of this embodiment, the influence on communication services can be reduced.

In the above-described processes, the wireless base station having the lowest degree of impact is selected. Alternatively, wireless base stations having degrees of impact equal to or lower than a predetermined threshold may be selected. Furthermore, if the date and time period scheduled for software update in the relevant base station matches those of an adjacent base station, a work date and a time period with the next lowest degree of impact may be re-selected or another work date and time period with a degree of impact equal to or lower than the above-described threshold may be re-selected for one of the base stations. Alternatively, a work date and time period with a degree of impact equal to or lower than a second predetermined threshold (for example, value larger than the above-described threshold) may be re-selected.

The present invention is applicable, for example, to the field of industry related to wireless communication systems including a plurality of base stations and apparatuses.

What is claimed is:

1. A network management apparatus in a wireless communication network, which comprises a wireless base station for performing communication between a wireless terminal and a wired communication network, and the network management apparatus for managing a network, the network management apparatus comprising:

a storage section stored in advance with information indicating a number of calls of connection with the wireless terminal in the wireless base station in association with a date, a day of the week, and a time period; and a processing section for selecting a date and a time period when software is updated in the wireless base station based on said information stored in said storage section, wherein the processing section:

inputs a plurality of work dates and time periods when the software can possibly be updated in the wireless base station, obtains n-week averages of the numbers of connection calls occurring during each input time period for each day of the week, based on the number of connection calls stored in the storage section, where n is a predetermined integer, obtains, for each number of dates in a month, an m-month averages of the numbers of connection calls occurring during each input time period for each stored date on the same date over the period from one to m months, based on the number of connection calls stored in the storage section, where m is a predetermined integer, calculates an average or a weighted average of the n-week average corresponding to each time period and the day of the week of each input work date and the m-month average corresponding to each time period and each input work date to obtain a degree of impact representing an impact caused by software update upon a communication service, selects a work date and a time period with the minimum degree of impact or with a degree of impact equal to or smaller than a predetermined threshold, and updates the software installed in the wireless base station during the selected time period on the selected work date.

2. A network management apparatus according to claim 1, wherein the processing section transmits software and an update request used for update according to the selected work date and time period to the wireless base station and updates the software installed in the wireless base station to the transmitted software.

3. A method of selecting a wireless base station to update software installed in the wireless base station at a selected time period on a selected date, the method comprising the steps of:

inputting a plurality of work dates and time periods when the software of the wireless base station can possibly be updated;

obtaining an n-week averages of the numbers of connection calls occurring during each of the input time periods for each day of the week, based on the number of calls of connection with a wireless terminal in the wireless base station, corresponding to each date, day of the week, and time period, where n is a predetermined integer;

obtaining, for each number of dates in a month, an m-month averages of the numbers of connection calls occurring during each of the input time periods for each date on the same date over the period from one to m months, based on the number of connection calls, where m is a predetermined integer;

calculating an average or a weighted average of the n-week average corresponding to each time period and the day of the week of each input work date and the m-month average corresponding to each time period and each input work date to obtain a degree of impact representing an impact caused by software update upon a communication service; and selecting a work date and a time period having the minimum degree of impact.

* * * * *